Aug. 23, 1938.  A. J. M. J. DURAND  2,128,082
FRAME FOR AGRICULTURAL MACHINES AND MOWING MACHINES COMPRISING THIS FRAME
Filed Sept. 19, 1935   2 Sheets-Sheet 1
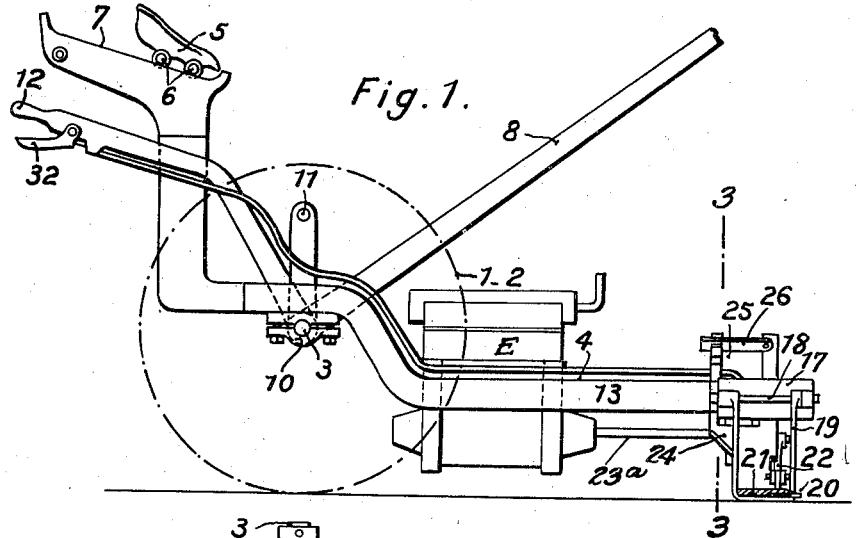
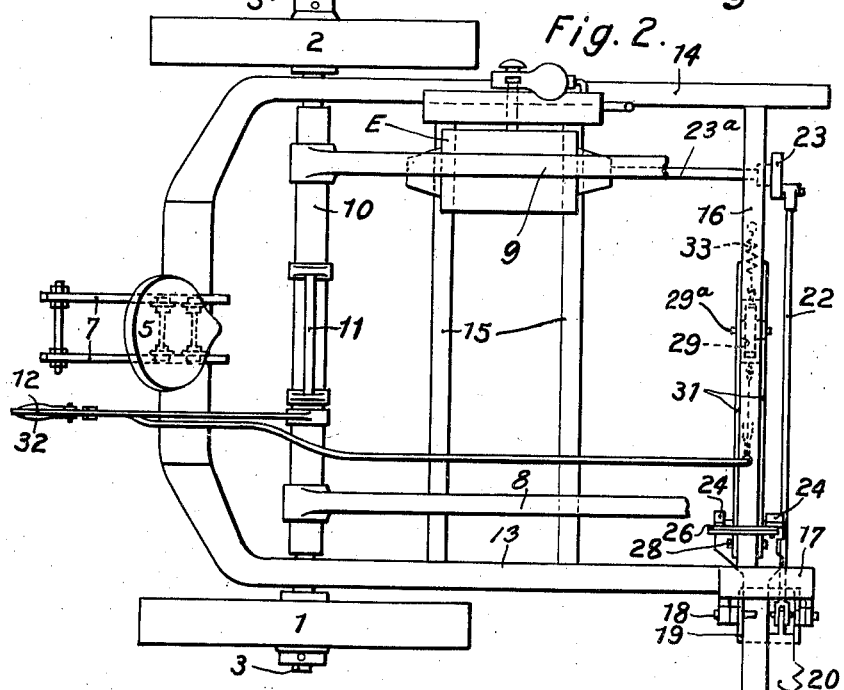
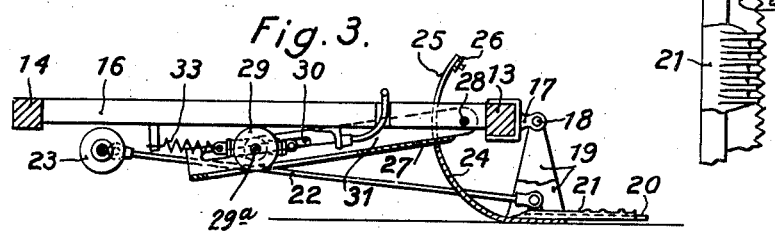
INVENTOR:
ALBERT JULES MARIUS JOSEPH DURAND
BY: Francis E. Boyce
ATTORNEY Aug. 23, 1938.　　　A. J. M. J. DURAND　　　2,128,082
FRAME FOR AGRICULTURAL MACHINES AND MOWING MACHINES COMPRISING THIS FRAME
Filed Sept. 19, 1935　　　2 Sheets-Sheet 2
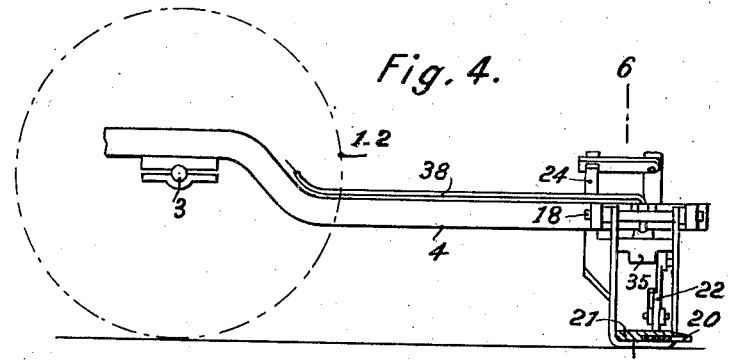
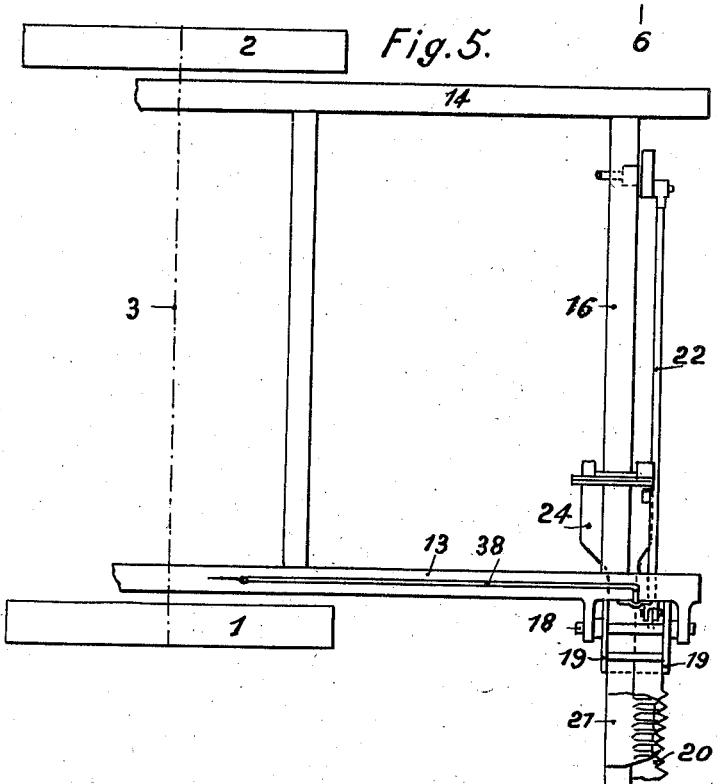
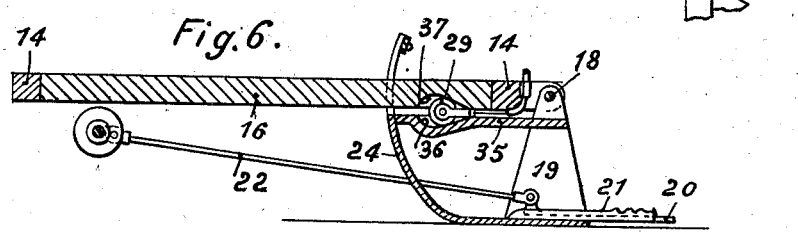
INVENTOR:
ALBERT JULES MARIUS JOSEPH DURAND
BY: Francis E. Boyer
ATTORNEY Patented Aug. 23, 1938

2,128,082

UNITED STATES PATENT OFFICE 2,128,082

FRAME FOR AGRICULTURAL MACHINES AND MOWING MACHINES COMPRISING THIS FRAME

Albert Jules Marius Joseph Durand, Montargis, France

Application September 19, 1935, Serial No. 41,233
In France September 22, 1934

12 Claims. (Cl. 56—25)

The present invention relates to:

A frame applicable to agricultural work, particularly for the construction of mowing machines, harvesting-binding machines, the operative members of which are actuated by an engine, characterized by the fact that it comprises a framework rockably mounted about the axle, the engine and the operative members, on the one hand, the operator, on the other hand, being supported by this framework and located on opposite sides of the axle. This distance of the operator's seat from the axle may be varied at will during the work, and a fixed bearing member allows the operator to add to the action of his own weight, the effect of his muscular strength.

A mowing machine constructed on the foregoing frame is further characterized by the fact that the mowing or cutting members are rockably mounted about a longitudinal horizontal spindle and the amplitude of the oscillation thus allowed is adjustable.

In a form of construction of this mowing machine, the mowing or cutting members are supported by a rocking yoke, the yoke terminates in a segment provided with a notch in order to limit the amplitude of the oscillations, and the useful length of the notch is adjustable by displacement in the latter of a movable abutment constituted by a resilient blade secured at one of its ends and the setting of which is adjustable.

In order that the invention may be clearly understood, a form of carrying the same into practice will now be described, by way of example, with reference to the accompanying drawings, in which:

Fig. 1 is an elevation;
Fig. 2 is a plan view;
Fig. 3 is a section taken on line 3—3 of Fig. 1, with parts broken away.
Figs. 4, 5, 6 are views similar to Figs. 1, 2 and 3 respectively, but showing a modified form of the invention, the sectional view, Fig. 6 being taken on line 6—6 of Fig. 4.

The frame rests on the ground through the medium of carrying wheels 1, 2 connected by an axle 3.

According to the invention, a frame 4 is rockably mounted about the axle 3. On one side of the axle, towards the front, this frame supports the operative members of the machine and the engine a conventional form of which is shown at E in Figs. 1 and 2 for actuating these members.

On the other side, towards the rear, it supports the operator driving the machine.

The operator is seated on a seat 5, mounted on rollers 6, and capable of moving, at right angles to the axle 3, in slides 7.

The masses of the two parts of the frame located on either side of the axle are such that the operator being seated on seat 5 in the position nearest the axle 3 (Figs. 1 and 2), the operative members of the machine can exert on the ground the slight pressure necessary for causing them to adhere thereon.

About the axle 3 is moreover mounted a structure constituted by shafts 8 and 9, a tube 10 surrounding the axle, a foot-rest 11 and a handle 12.

The position of this structure relatively to the ground is constantly determined by its coupling, by means of the shafts 8 and 9, to a tractor or to a draft animal.

In the form of construction described, the frame 4 comprises two longitudinal bearers 13 and 14 connected by cross members 15 and 16.

The members belonging to the mower, which form by their organization an important part of the invention, are arranged at the front of the frame 4.

To the longitudinal bearer 13 is secured a fork piece 17 supporting the pivot pin 18 of a yoke 19 (Fig. 3).

This yoke supports the usual cutter bar 20 as well as the blade-carrying member 21.

The cutting blade is set in motion by a connecting rod 22, driven by a crank-plate 23, connected by a shaft 23$^a$ to the engine E supported by the frame 4.

A segment 24 is rigid with the yoke 19. It is provided with a notch 25 (Fig. 3) for the passage of the cross member 16 and, if need be, with a cut away part for the passage of the connecting rod 22.

The upper end wall of the notch 25 is constituted by a locking member 26.

Through the notch 25 passes a member 27 pivoted, at its end 28, on the cross member 16 and oblique relatively to the horizontal.

A roller 29 is mounted on a pintle 29$^a$ the ends of which are slidable in slots 30 formed in the cheeks 31 of member 27. It is in contact with the under side of cross member 16. Its displacement in the slides 30 is effected under the action of a cable of the Bowden type connected to a lever 32 pivoted on the handle 12. A spring 33 constantly tends to move the roller 29 away from the end 28.

It will be understood that this mode of suspension of the cutting bar allows the latter to adapt itself, at every instant, by oscillation about the pivot pin 18, to the transverse profile of the ground passed over.

Moreover, as, according to the invention, the frame is rockably mounted, it allows, at every instant, a vertical displacement of the mowing or cutting members. This displacement ensures the adaptation of the cutting bar to the longitudinal profile of the ground passed over.

For this displacement, it suffices for the operator driving the machine to move his seat 5 on the slides 7 by pressing with his feet against the foot-rest 11.

This action, due to the variation of the leverage by means of which the operator's weight exerts its action, can be completed by the effect of the muscular strength of the operator, owing to the fact that he can grasp the fixed handle 12.

During mowing, the segment 24 moves between the limits constituted by the end walls of the notch 25, that is to say by the locking member 26 cooperating with the member 27 and the lower end wall of the notch.

For instantaneously lifting the cutter bar, considering the mowing or cutting members supported on one side of the suspension pin 18 are heavier than the segment 24 arranged on the other side of this pin, it is necessary that the resilient member 27 should come in contact with the lower end wall of the notch 25.

This result is obtained by gripping the lever 32 which is a natural movement for the operator since, for lifting the cutter bar, he helps himself by exerting a pull on the handle 12.

The present specification is given by way of example only, as numerous modifications can be effected, particularly concerning the axle, which might be a cranked axle, the position of the wheels, the composition of both units balancing each other, the position of the cutter bar which might be located behind the axle relatively to the direction of advance; other members can also be fitted on the frame, in particular those belonging to a harvesting-binding machine.

Instead of locking the cutter bar according to the inclination it occupies relatively to the ground at the time of lifting by the mechanism which has just been described and including the member 27 pivoted on a cross bar of the framework, a slightly different mechanism can be provided. The latter consists in a floor 35, Figs. 4 to 6, rigid with the segment 24 terminating the yoke 19 and which is opposite a corresponding floor rigid with the frame, and in the ordinary case constituted by the cross member 16 of the framework. The pivot pin is the suspension pin 18 of the yoke. The roller 29 is interposed between both floors forming jaw-like members. Notches 36 and 37 are provided in both floors for allowing complete oscillation of the blade until both floors come in contact together.

The roller 29 is also controlled by the transmission 38.

With this arrangement, the operation is similar to that described above. When the driver sees an obstacle, he pulls upon the transmission for moving the roller 29 within the angle formed by both floors, so as to hold the blade stationary in the position it occupies relatively to the horizontal. At the same time, he moves backward for obtaining the general lifting of the machine.

What I claim as my invention and desire to secure by Letters Patent is:—

1. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—and means for varying the distance of the operator's seat from the axle at will during the work.

2. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being capable of variation at will during the work,—and a fixed bearing member allowing the operator to add to the action of his own weight the effect of his muscular strength.

3. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being variable at will during the work,—and the mowing or cutting members being rockably mounted about a longitudinal horizontal spindle.

4. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being variable at will during the work,—mowing or cutting members being rockably mounted about a longitudinal horizontal spindle,—the amplitude of the oscillations thus allowed being adjustable.

5. A frame applicable to agricultural work, particularly for the construction of mowing machines, harvesting-binding machines, an engine, operative members actuated by said engine, a framework being rockably mounted about the axle, said framework being adapted to support the engine and the operative members on the one hand and the operator on the other hand at opposite sides of the axle,—the distance of the operator's seat from the axle being variable at will during the work,—and the mowing or cutting members being supported by a rocking yoke.

6. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being variable at will during the work,—the mowing or cutting members being supported by a rocking yoke,—said yoke terminating in a segment provided with a notch in order to limit the amplitude of the oscillations.

7. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being variable at will during the work,—the mowing or cutting members being supported by a rocking yoke,—said yoke terminating in a segment provided with a notch in order to limit the amplitude of the oscillations,—and the useful length of the notch being adjustable by displacement in the latter of a movable abutment constituted by a resilient blade secured at one of its ends and the setting of which is adjustable.

8. In a frame applicable to agricultural work, particularly for the construction of mowing machines, harvesting-binding machines, an engine, operative members actuated by said engine, a framework rockably mounted about the axle, said framework being adapted to support the engine and the operative members on the one hand and the operator on the other hand at opposite sides of the axle,—the distance of the operator's seat from the axle being variable at will during the work,—the frame moreover comprising a floor rigid with the mowing or cutting system, a floor rigid with the framework, both floors constituting jaw-like members, and a movable roller being fitted into these jaws for locking the mowing or cutting member at the inclination it assumes when the apparatus is to be lifted.

9. A frame for agricultural machines as set forth in claim 2, the said fixed bearing member being independent of said framework.

10. A frame for agricultural machines as set forth in claim 2, said fixed bearing member being a lever mounted independently of said framework.

11. A frame for agricultural machines as set forth in claim 2, said framework having a portion thereof disposed in a plane inclined to the horizontal, and the seat for the operator being mounted on said inclined plane.

12. A frame for agricultural machines as set forth in claim 4, including a lever mounted independently of said framework within reach of the operator, and a lever pivoted on said first lever for controlling the rocking of said mowing or cutting members.

ALBERT JULES MARIUS JOSEPH DURAND.